J. PARDUBA.
BRASS MUSICAL WIND INSTRUMENT.
APPLICATION FILED MAR. 22, 1915.
1,197,058.
Patented Sept. 5, 1916.
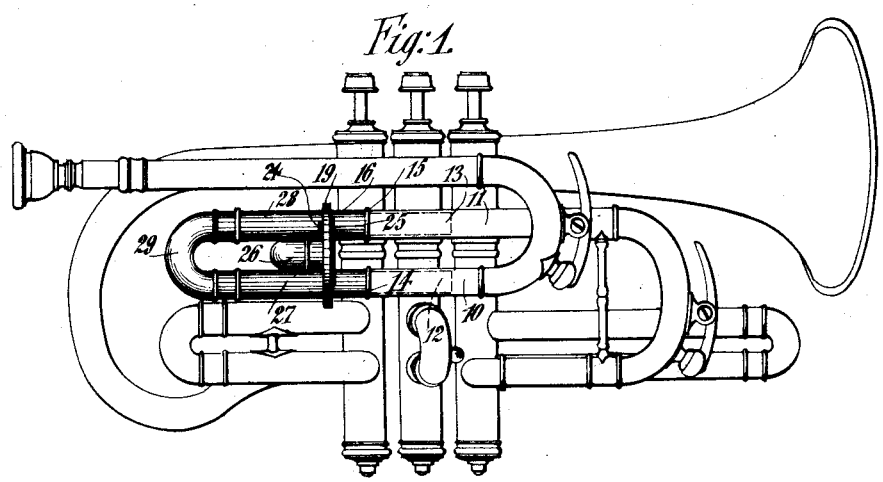
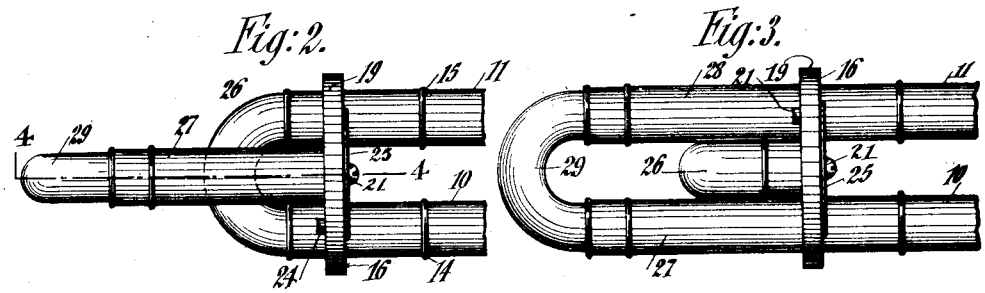
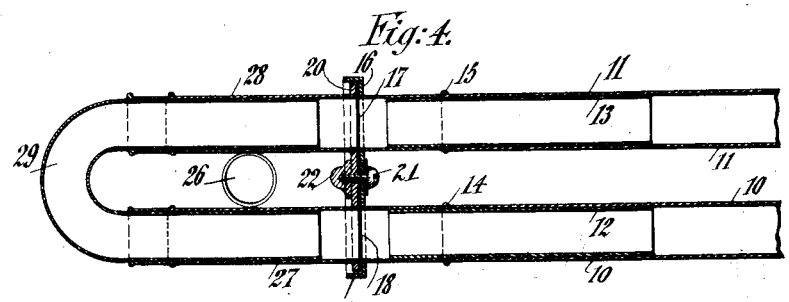
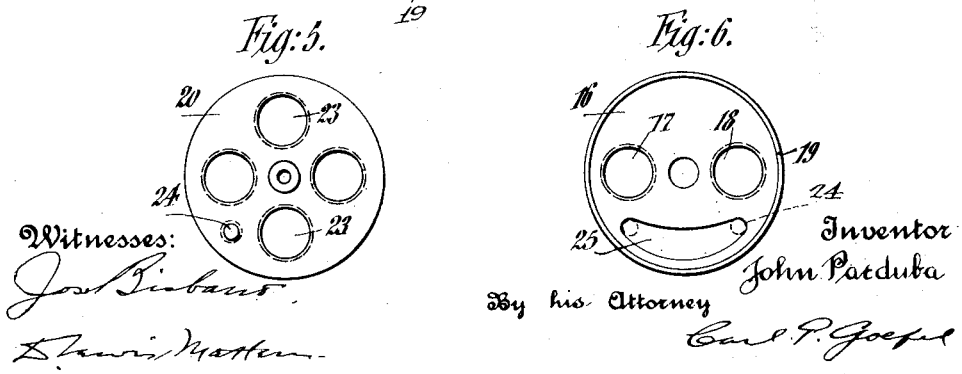
Witnesses:
Inventor
John Parduba
By his Attorney

UNITED STATES PATENT OFFICE.

JOHN PARDUBA, OF NEW YORK, N. Y.

BRASS MUSICAL WIND INSTRUMENT.

1,197,058.     Specification of Letters Patent.     Patented Sept 5, 1916.

Application filed March 22, 1915. Serial No. 16,095.

*To all whom it may concern:*

Be it known that I, JOHN PARDUBA, a citizen of the United States, and a resident of the borough of the Bronx, county of the Bronx, city and State of New York, have invented certain new and useful Improvements in Brass Musical Wind Instruments, of which the following is a specification.

This invention relates to improvements in brass musical wind instruments in which the pitch may be readily changed from B flat to A natural as desired, without any interruption in the use of the instrument by the musician.

The object of the invention is to provide a pitch changing device which is neat, compact and simple in construction and easily applied to any standard instrument.

The invention comprises the novel features, arrangements, and combinations of parts, hereinafter more fully described with reference to the accompanying drawings, and particularly pointed out in the claim.

In the drawings, Figure 1 is an elevational view of a cornet, showing the application of my invention thereto; Fig. 2 is an elevational view of my improved attachment showing the same in B-flat position; Fig. 3 is an elevational view showing the attachment in A-natural position; Fig. 4 is a sectional view on the line 4—4 of Fig. 2; Fig. 5 is an end view of one portion of my device; and Fig. 6 is an end view of the other portion thereof.

Similar reference characters indicate corresponding parts throughout the several views.

Referring to the drawings, and more particularly to Fig. 1 thereof, a cornet or other such wind instrument is preferably provided at the ends of two connecting tubes 10 and 11, usually connected by a U-shaped slide piece, within convenient access of the musician, with my improved attachment, which comprises two tubes 12 and 13 adapted to slidably engage the ends of the said tubes 10 and 11 of the horn and limited in movement within the same, by shoulders 14 and 15 of the tubes 12 and 13. Secured to the outer end of the same is provided a disk 16 having apertures 17 and 18 therein, registering with the ends of the tubes, and an annular upturned rim portion 19. Rotatably mounted within the said annular rim and against the disk 16 is removably secured a second disk 20 by means of a screw 21 passing through the disk 16 and threaded into a projection 22 on the disk 20. The said disk 20 is provided with two openings 23 disposed at diametrically opposite points and with two openings 23' also disposed at diametrically opposite points on a diametrical line which crosses at right angles the diametrical line on which the openings 23, 23 are located. When the openings 23, 23 register with the openings 17, 18, a turn of ninety degrees of one disk on the other brings the openings 23' and 23' into register with said openings 17 and 18 and then a turn of ninety degrees in the opposite direction restores the connection of the openings 23, 23 with the openings 17, 18. This construction, involving the two full disks with turns of ninety degrees, avoids a wabbling connection and secures accuracy of register between the pipes of one disk and those of the other. A screw or lug 24 on the disk 20 engages in an arcuate recess 25 of the disk 16, so that rotation of the disk 20 is limited to an arc of 90°, or so that the holes will correctly register.

Secured to the disk 20 and connecting diametrically opposite openings 23 is provided a U-shaped tube 26 adapted to give to the instrument when in registration with the openings of the disk 16 the B-flat pitch, and secured to the disk in registration with the other openings are two tubes 27 and 28 in the ends of which is mounted a U-shaped tuning slide piece 29 adapted to give to the instrument the A-natural pitch when in registration with the openings of the disk 16, as above pointed out.

It will be seen that with my improved attachment, the pitch of the instrument may be readily and accurately changed by rotation of the disk 20 within the arcuate recess 25 from B-flat to A-natural, or vice versa, without necessitating removing the same from the mouth of the musician, and without requiring a stop in the playing.

I have illustrated preferred and satisfactory forms of my invention, but it is obvious that changes may be made therein within the spirit and scope thereof, as defined in the appended claim.

I claim:—

A pitch changing device for a musical wind instrument comprising a disk provided with a peripheral flange and with two air tubes equidistant from the center on a diametrical line, a disk provided with two U-shaped return tubes of different lengths, the longer tube straddling the shorter tube at right angles, said return tubes being each adapted to connect the tubes of the first disk on a relative rotation of ninety degrees, means for holding said disks in frictional contact, and means for arresting the relative movement of the disks when either of said return tubes is in register with said first disk tubes.

In testimony that I claim the foregoing as my invention, I have signed my name in presence of two subscribing witnesses.

JOHN PARDUBA.

Witnesses:
F. HOGG,
JOS. BISBANO.